United States Patent
Berman et al.

(10) Patent No.: US 12,049,037 B2
(45) Date of Patent: Jul. 30, 2024

(54) MATERIAL INTERLOCKING

(71) Applicant: Inkbit, LLC, Medford, MA (US)

(72) Inventors: Ari Berman, Lexington, MA (US); Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 332 days.

(21) Appl. No.: 17/501,340

(22) Filed: Oct. 14, 2021

(65) Prior Publication Data

US 2022/0126505 A1 Apr. 28, 2022

Related U.S. Application Data

(62) Division of application No. 17/082,784, filed on Oct. 28, 2020, now Pat. No. 11,186,033.

(51) Int. Cl.
| | |
|---|---|
| *B29C 64/00* | (2017.01) |
| *B29C 64/112* | (2017.01) |
| *B33Y 10/00* | (2015.01) |
| *B33Y 80/00* | (2015.01) |

(52) U.S. Cl.
CPC ............ *B29C 64/00* (2017.08); *B29C 64/112* (2017.08); *B33Y 10/00* (2014.12); *B33Y 80/00* (2014.12); *Y10T 428/24273* (2015.01)

(58) Field of Classification Search
None
See application file for complete search history.

(56) References Cited

U.S. PATENT DOCUMENTS

| | | |
|---|---|---|
| 3,574,019 A | 4/1971 | Girard |
| 7,018,496 B1 | 3/2006 | George et al. |
| 7,181,811 B1 | 2/2007 | Tomanek et al. |
| 10,252,466 B2 | 4/2019 | Ramos et al. |
| 10,456,984 B2 | 10/2019 | Matusik et al. |
| 10,769,324 B2 | 9/2020 | Matusik et al. |
| 2010/0009133 A1 | 1/2010 | Chait |
| 2020/0124403 A1 | 4/2020 | Weber et al. |
| 2020/0156308 A1 | 5/2020 | Ramos et al. |
| 2020/0215761 A1 | 7/2020 | Chen et al. |
| 2020/0223147 A1 | 7/2020 | Chen et al. |

FOREIGN PATENT DOCUMENTS

| | | | |
|---|---|---|---|
| EP | 2860020 A1 | 4/2015 | |
| WO | 2020040719 A1 | 2/2020 | |
| WO | WO-2020040719 A1 * | 2/2020 | ............. B29C 64/10 |

OTHER PUBLICATIONS

International Search Report and Written Opinion, PCT Application No. PCT/US2021/055534, mailed Jan. 5, 2022 (16 pages).
PlusalphaDesigns. "Print in Place Jigsaw Puzzle Ring." Thingiverse, Dec. 6, 2019, www.thingiverse.com/thing:4027346.

\* cited by examiner

*Primary Examiner* — Jacob T Minskey
*Assistant Examiner* — Caroline Beha
(74) *Attorney, Agent, or Firm* — Occhiuti & Rohlicek LLP

(57) ABSTRACT

A method comprises using a three-dimensional additive manufacturing process to produce an interlocking volume, wherein using the additive manufacturing process includes depositing successive layers, each of which includes a first material distributed according to a first interlocking material pattern and a second material distributed according to a second interlocking material pattern, said second material differing from said first material.

14 Claims, 10 Drawing Sheets

MATERIAL INTERLOCKING

CROSS-REFERENCE TO RELATED APPLICATIONS

This application is a divisional application of U.S. application Ser. No. 17/082,784 filed on Oct. 28, 2020, the contents of which are incorporated by reference.

BACKGROUND OF THE INVENTION

The present invention relates to additive manufacturing processes based on material jetting "inkjet" technology.

Additive manufacturing allows objects to be fabricated via selective addition of material. A typical additive manufacturing process works by slicing a digital model into data representing a series of layers. Such a model is typically represented as an "STL" file.

The data representing the layers is sent to a fabrication apparatus. The fabrication apparatus uses that data to deposit physical layers one by one from the bottom to the top.

Material jetting "inkjet 3D printing" is a method of additive manufacturing in which printheads deposit droplets of printable material, which is sometimes called "ink." A typical printer used for such printing includes one or more printheads mounted on a gantry to allow deposition of printable liquid matrix material in different locations of a "build volume." The printable liquid matrix material is solidified using UV or visible-light radiation.

In some of these printers, the print heads move during the printing process. In others, the article being fabricated rests on a movable "build platform" that moves relative to the print heads.

Certain printers can construct objects that are made from two or more different materials. To do so, such printers typically employ different print heads to deposit different materials. This results in a composite heterogeneous structure that has different portions made from different materials. Such an object will be referred to herein as a "multi-material object." These multi-material object can be represented by a set of solid models each model representing one type of material. These different materials are typically selected because they have different material properties. For example, one material might be rigid, while another may be flexible or soft. It is often the case that these different materials do not naturally adhere to one another. As a result, the composite structure risks cleaving along boundaries between different materials. The need to consider these surface adhesion properties limits the choice of materials.

SUMMARY OF THE INVENTION

Within a multi-material object, the surface where two different types of materials contact each other is referred to as the "material interface." The geometry or topology of these material interfaces can be constructed to create interlocking patterns that create a strong mechanical connection between the materials. This mechanical connection compensates for the absence of good chemical adhesion.

In a general aspect of the invention, a method includes using a three-dimensional additive manufacturing process to produce an interlocking volume. In such a method, using the additive manufacturing process includes depositing successive layers, each of which includes a first material distributed according to a first interlocking material pattern and a second material distributed according to a second interlocking material pattern, This second material differs from said first material.

Among the practices of the method are those in which the distribution of the second material is complementary to that of the first. As a result, those portions of the interlocking volume that are not occupied by the first material will be occupied by the second and vice versa.

The methods and structures described herein are particularly useful for materials that do not naturally adhere to each other well. Examples include epoxies and acrylates, which adhere only weakly to each other.

In some practices of the method, the interlocking volume includes first and second sets of interlocking structures formed from the first and second materials, respectively. In such practices, the spatial distribution of the interlocking structures in the first and second sets is based on corresponding first and second interlocking material patterns.

Yet other practices of the method include those in which the interlocking structure is produced on a boundary region that is defined by an arbitrary function of two variables. Among these are embodiments in which the function defines a plane, in which case the boundary region is one that has a uniform flat surface. For simplicity, the drawings described herein show material interfaces that are uniform flat surfaces. However, interlocking patterns as described herein can be parametrically extended to support curved material interfaces.

Among the practices of the method are those in which each interlocking structure in the first set forms a toroidal element having a central-hole diameter and a toroidal diameter. These diameters are determined based on first-material information and second-material information. The first-material information and second-material information includes information about the first and second materials respectively.

In some practices of the method, each interlocking structure in the first one or both of the above-mentioned diameters has been modified to achieve a skew, shift, or transform of the overall shape of the interlocking structure.

Alternative practices of the method include the steps of fabricating a first-material volume and a second-material volume with the interlocking volume being located between the first material volume and the second material volume.

Also among the practices of the method are those in which each interlocking structure in the first set includes a reinforcement region located at an interface between the interlocking structure and the first-material region. Among these practices are those that include making the reinforcement region circular or nearly circular.

In another aspect of the invention, a manufactured object formed by three-dimensional additive fabrication includes a first volume fabricated from a first material; a second volume fabricated from a second material; and a transition volume. Within the transition volume are first and second sets of interlocking structures. The interlocking structures in the first set are integral with the first region and fabricated from the first material. The interlocking structures in the second set are integral with the second volume and fabricated from the second material. Each interlocking structure from the first set interlocks with at least one interlocking structure from the second set. As a result, the first and second sets of interlocking structures cooperate to mechanically couple the object's first and second volumes.

In some embodiments, interlocking structure in the first set of interlocking structures forms a closed loop. Among these are embodiments in which the closed loop is toroidal.

Other embodiments include those in which each interlocking structure in the first number of interlocking structures has a central hole diameter and a toroidal ring diameter. These diameters are modified either together or independently based on the application.

Still other embodiments include those in which each interlocking structure in the first set of interlocking structures includes a rounded reinforcement structure located at the interface between the interlocking structure and the first region. Among these embodiments are those in which the reinforcement structure comprises a berm.

Other embodiments of the manufacture feature a third set of interlocking structures. Each interlocking structure in the third set couples to an interlocking structure from either the first set or the second set.

In another aspect, the invention features using an additive manufacturing process to manufacture an object that includes first and second volumes that are made of corresponding first and second materials that differ from each other. In such cases, using the additive manufacturing process includes forming protrusions from the first material, these protrusions projecting into the second material and engaging the second material so as to resist tensile forces and shear forces on the object.

Among the practices of the method are those in which forming protrusions includes forming a toroid that projects from the first volume and into the second volume and those in which forming projections includes forming hooks that project into the second volume.

Also among the practices are those in which forming projections includes forming a connected and orientable surface having a topological genus that is greater than zero, i.e., of one or more, and those in which forming projections includes forming a connected and orientable surface having a topological genus that is equal to 1.

Also among the practices are those in which forming projections includes depositing first, second, and third layers, each of which includes a first portion made of the first material, a second portion made of the second material, and a third portion between the first and second portions, wherein the first layer's third portion includes first and second regions, each of which is made of the first material and that surrounded by the second material, wherein the second layer's third portion includes first and second regions that are made of the first material, that are surrounded by the second material, and that overlap at most partially with the first and second regions of the first layer, wherein the third layer's third portion includes a region that is made of the first material, that is surrounded by the second material, and that overlaps, at least in part, the first and second regions of the second layer, and wherein the first and second regions of the first and second layers and the region of the third layer are constituent parts of one of the projections.

Among other advantages, materials that would be difficult to bind without using conventional adhesives can be bound without the use of adhesives.

As compared to conventional additive fabrication processes, materials that might not remain connected if printed adjacent to each other (e.g., due to poor mechanical cohesion) can be securely bound.

Other features and advantages of the invention are apparent from the following description, and from the claims.

DETAILED DESCRIPTION

Figure 1:
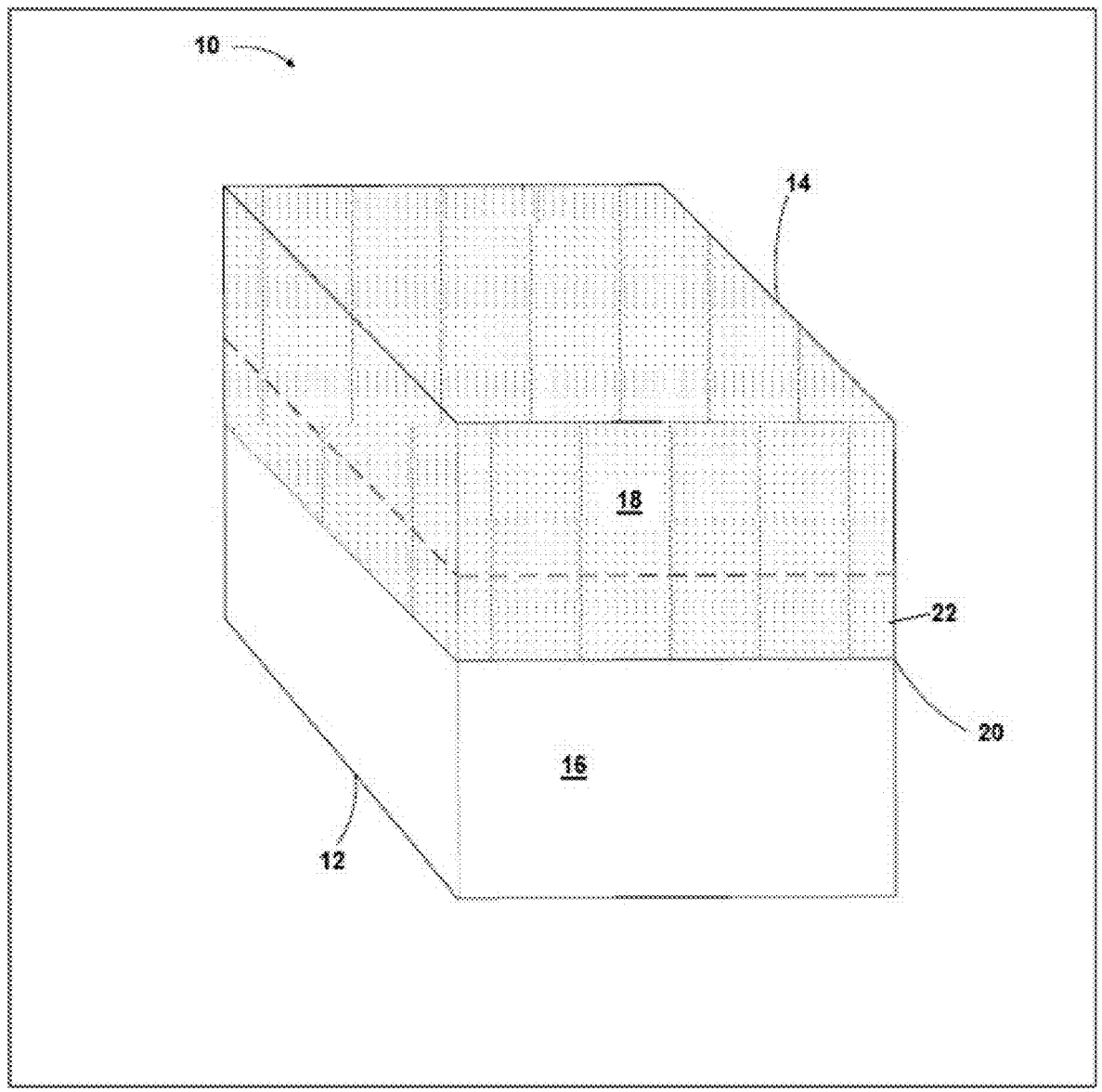
FIG. 1 is a perspective view of an object made using an additive manufacturing process and having an interface between two volumes made of different materials.

FIG. 1 shows an object 10 that has been manufactured using a three-dimensional additive manufacturing process. Such a process includes depositing one layer of material at a time according to a "build plan." Each layer can be composed of one or more materials.

The object 10 includes a first volume 12 and a second volume 14. The first volume 12 comprises a first material 16. The second volume 14 comprises a second material 18 that differs from the first material 16. In a typical embodiment, the first material 16 is a pliable material and the second material 18 is a rigid material.

The first and second volumes 12, 14 meet at a planar interface 20. A portion of the second volume 14 adjacent to the interface 20 defines a transition volume 22, or "interlocking volume." Within this transition volume 22, there are interlocking projections 24 (which are hidden) project from the first volume 12 and into the second material 18 which operate to interlock the first and second volumes 12, 14. These projections 24 thus define "interlocking structures." The projections 24 are hidden in FIG. 1. However, an example of a projection 24 can be seen in FIGS. 2 and 3.

Figure 2:
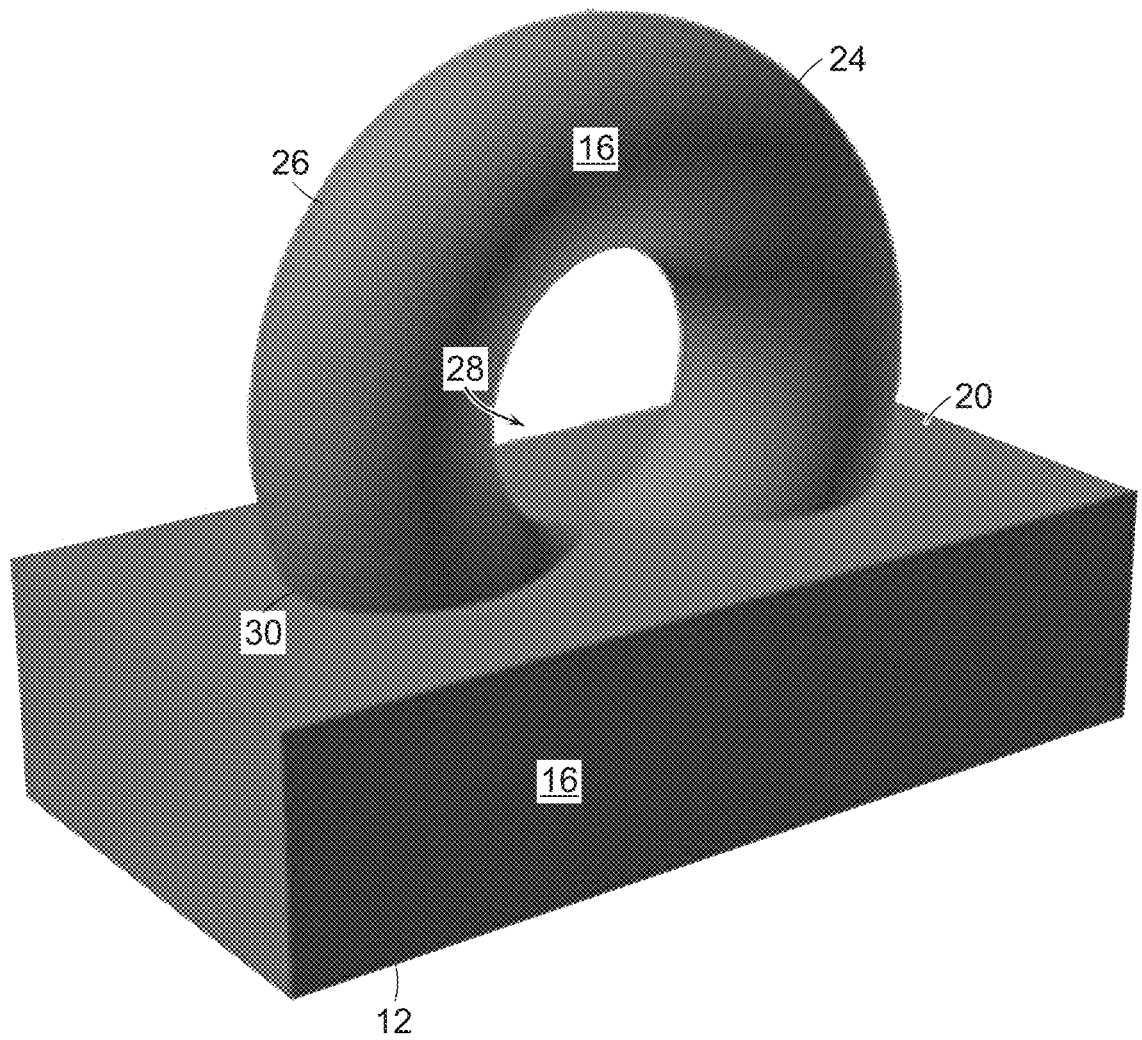
FIG. 2 shows one of many projections from the first volume into the second volume that cooperate to interlock the two volumes shown in FIG. 1.
Figure 3:
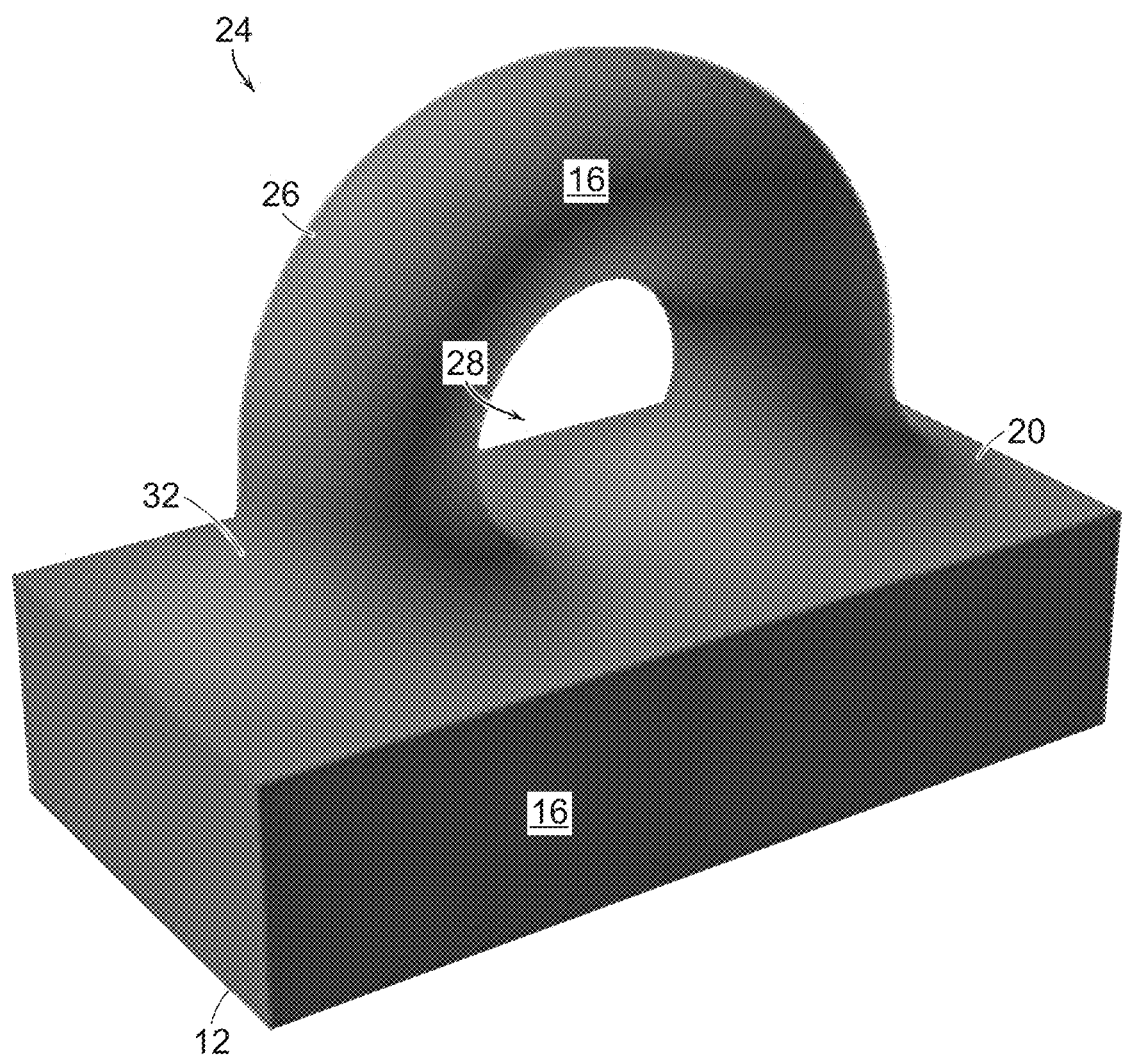
FIG. 3 shows berms that provide a smooth transition between the first volume and the projection shown in FIG. 2.

As shown in FIGS. 2 and 3, each such projection 24 is integral with the first volume 12 and are. Accordingly, the projections 24 are made of the first material 16.

The projection 24 includes a toroidal portion 26 and a hole 28. In some examples, the hole 28 is substantially circular. In the illustrated embodiments, the toroidal portion 26 and the first volume 12 together define the hole 28. In others, the toroidal portion 26 completely defines the hole 28.

In FIG. 2, the toroidal portion 26 protrudes from the first volume 12 at a pair of roots 30. Each side of the toroidal portion 26 emerges from a corresponding one of the roots 30. The junction between the root 30 and the toroidal portion 26 forms an edge. This edge is prone to mechanical stress.

FIG. 3 shows a projection 24 in which a berm 32 reinforces the root 30 shown in FIG. 2. The berm 32 eliminates the sharp corners where the toroidal portion 26 would otherwise have met the root 30. The berm 32 thus eliminates the region prone to mechanical stress by distributing that mechanical stress over a larger region. The resulting projection 24 is thus less prone to fracture.

In FIGS. 2-3, the toroidal portion 26 and the interface 20 together form a closed loop. This loop encircles a portion of the second volume 14. This encircled portion is integral with those portions of the second volume 14 that are not encircled by the projection 24. Topologically, these encircled portions of the second volume 14 would also form closed loops that project from the second volume 14 and into the transition volume 22. However, the resulting loops need not be shaped like those defined by the projections 24. Together, the structures within the transition volume 22 cooperate to resist both a first force and a second force that is transverse to the first force. The first force is one that acts in a direction that urges the first and second volumes 12, 14 to separate. This will be referred to herein as a "longitudinal force." The second force urges the first and second volumes to slide relative to each other. This second force will be referred to as a "transverse force" or "shear force."

During fabrication, it is possible to independently parameterize the toroidal portion 26, the hole 28, and the form of the berm 32. Parametrization is based on material properties of the first and second materials or a comparison of these properties. Examples of such material properties include tensile strength and shear strength.

In the course of such fabrication, print heads move to different locations above a plane to eject first and second materials 16, 18 onto the plane. This results in the formation of a layer. In the course of doing so, the print heads form the projections 24 by laying down layers with particular spatial distributions of the first and second materials 16, 18 in the transition volume 22. By causing each layer to have a slightly different spatial distribution of first and second materials 16, 18, it is possible to form three-dimensional projections 24 within the transition volume 22. The spatial distributions of the first and second materials 16, 18 are referred to as the first and second "interlocking material patterns."

In the case of the toroidal projection 24, some of the layers feature two regions made of the first material 16. These two regions represent a cross section through the toroidal projection 24. The two regions move closer together as the projection is built up layer-by-layer until they merge into one region towards the distalmost portions of the projection 24.

Each such projection 24 is made of the first material 16. In the embodiments shown in FIGS. 2 and 3, each projection 24 forms a closed loop that encircles a portion of the second volume 14 while still being connected to the first volume 12. As a result, the projection 24 encloses a portion of the second material 18. By having a multiplicity of such projections 24, it is possible to securely bind the first and second materials 16, 18 together.

A strength of the resulting binding between the first and second materials 16, 18 is defined, at least in part, based on the tensile strengths of the respective materials 16, 18. This technique is particularly useful when the materials 16, 18 are dissimilar in mechanical properties.

For example, if the object 10 being fabricated is a shoe, the first region might be the shoe's outer sole and the second region might be the shoe's mid sole. Thus, the first material 16 may be a pliable material for the sole and the second material 18 may be a more rigid material used for the shoe's mid sole. These would ordinarily be difficult to bind with without the use of an adhesive.

In a conventional additive fabrication process, one could simply print the first and second materials 16, 18 next to each other. However, this would not guarantee a good connection. After all, dissimilar materials do not always have good mechanical cohesion. However, since at least one of the materials has high tensile strength, it is possible to bind them using a multiplicity of projections 24 in an additive manufacturing process.

Typically, the thickness of the first and second volumes 12, 14 has been optimized to achieve specific design goals. For instance, in a shoe, the outer sole should be thick enough to have acceptable wear life but not so thick that it becomes burdensome to lift with each step. A further advantage of the illustrated projections 24 is that the transition volume 22 can be kept very small.

Figure 4:
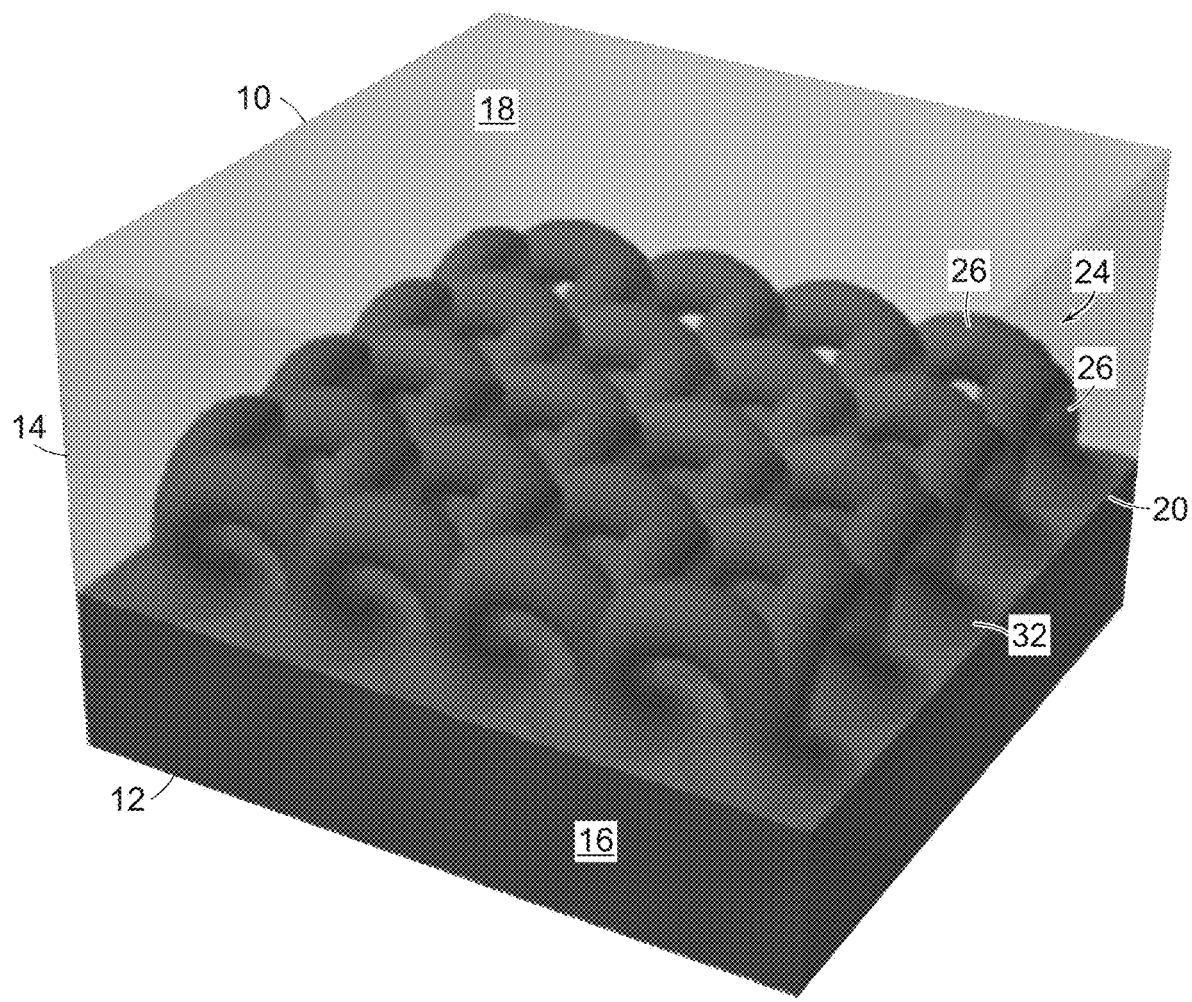
FIG. 4 shows projections of the type shown in FIG. 3 arranged to form a rectilinear array.

FIG. 3 shows a single projection 24 in which each berm 32 is integral with one end of the projection's toroidal portion 26. However, in practice, there will be a multiplicity of such toroidal portions 26, as shown in FIG. 4. Having a multiplicity of projections 24 as shown in FIG. 4 more effectively binds the first and second volumes 12, 14 together.

Figure 5:
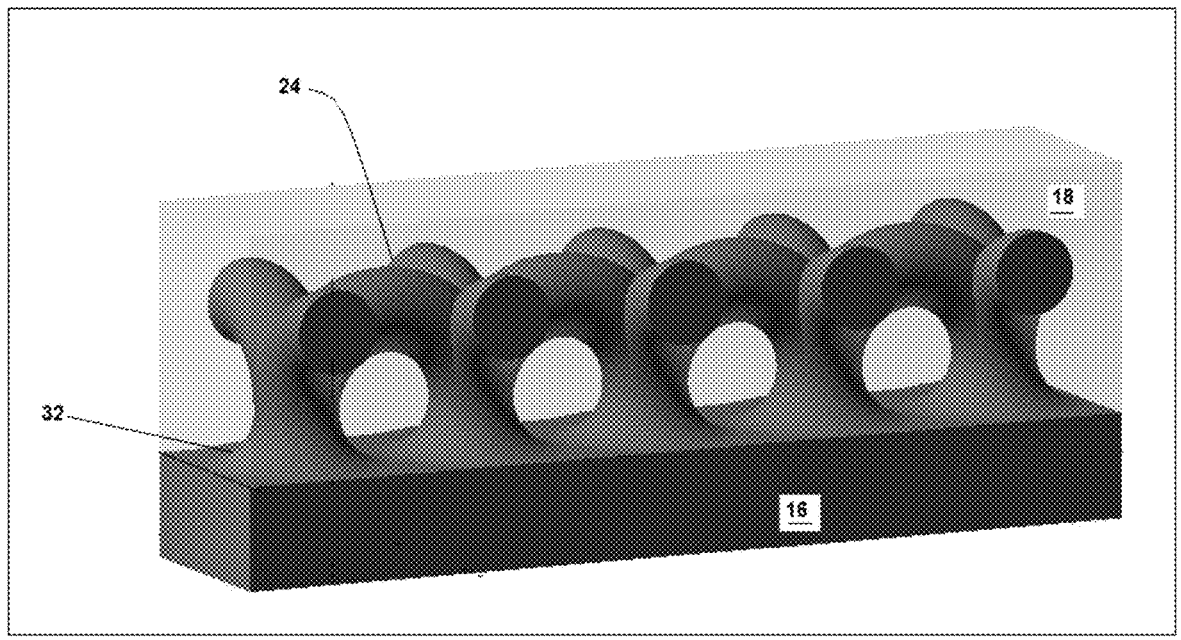
FIGS. 5-6 show sections of the rectilinear array of projections shown in FIG. 4.
Figure 6:
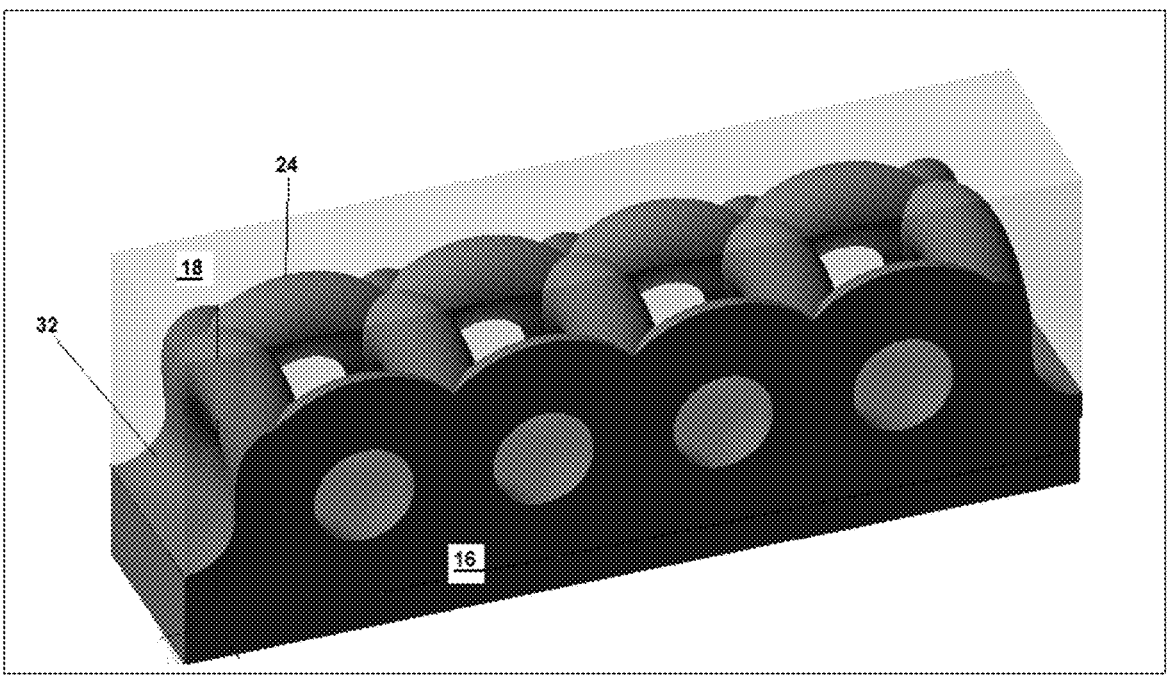

FIG. 4 shows a particular arrangement of projections 24 in which two or more toroidal portions 26 of two or more projections 24 originate from the same berm 32. This permits an arrangement of interlocks 24 that forms a rectangular array. FIGS. 5 and 6 shows selected portions of a rectangular array, as shown in FIG. 4.

Figure 7:
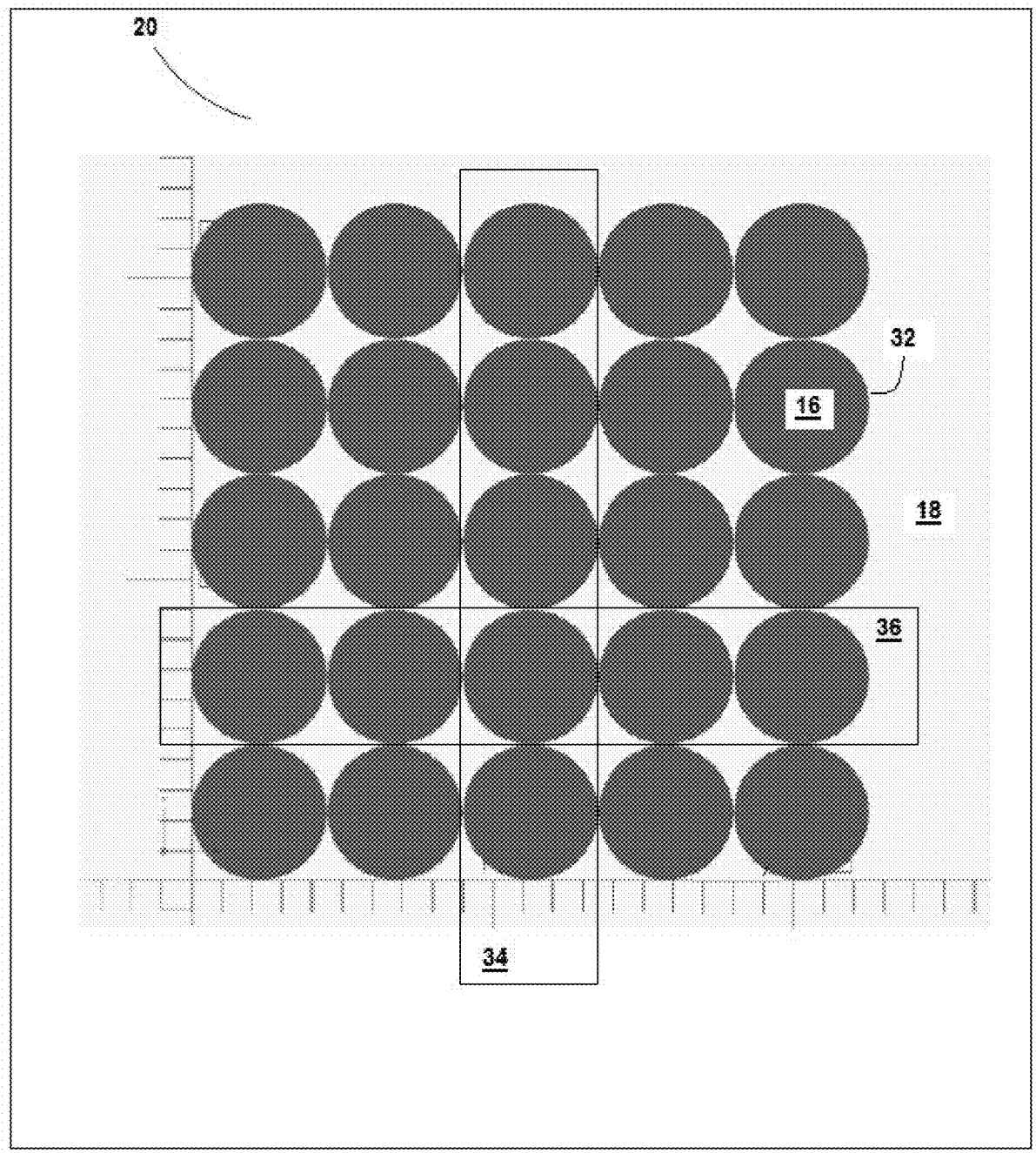
FIG. 7 shows a distribution of berms corresponding to the array shown in FIG. 4.

FIG. 7 illustrates the distribution of berms 32 that results in the rectangular array shown in FIG. 4. The rectangular array features berm columns 34 and berm rows 36.

Each toroidal portion 26 has a first end that originates in a first berm 32 and a second end that originates in a second berm 32. The first and second berms are either in the same berm column 34 or in the same berm row 36. As a result, in FIG. 4, there are no diagonal connections. Equivalently, there exists no toroidal portion 26 having a first end originating in a first berm and a second end that originates in a second berm that is neither in the same column 34 nor in the same row 36 as the first berm.

Figure 8:
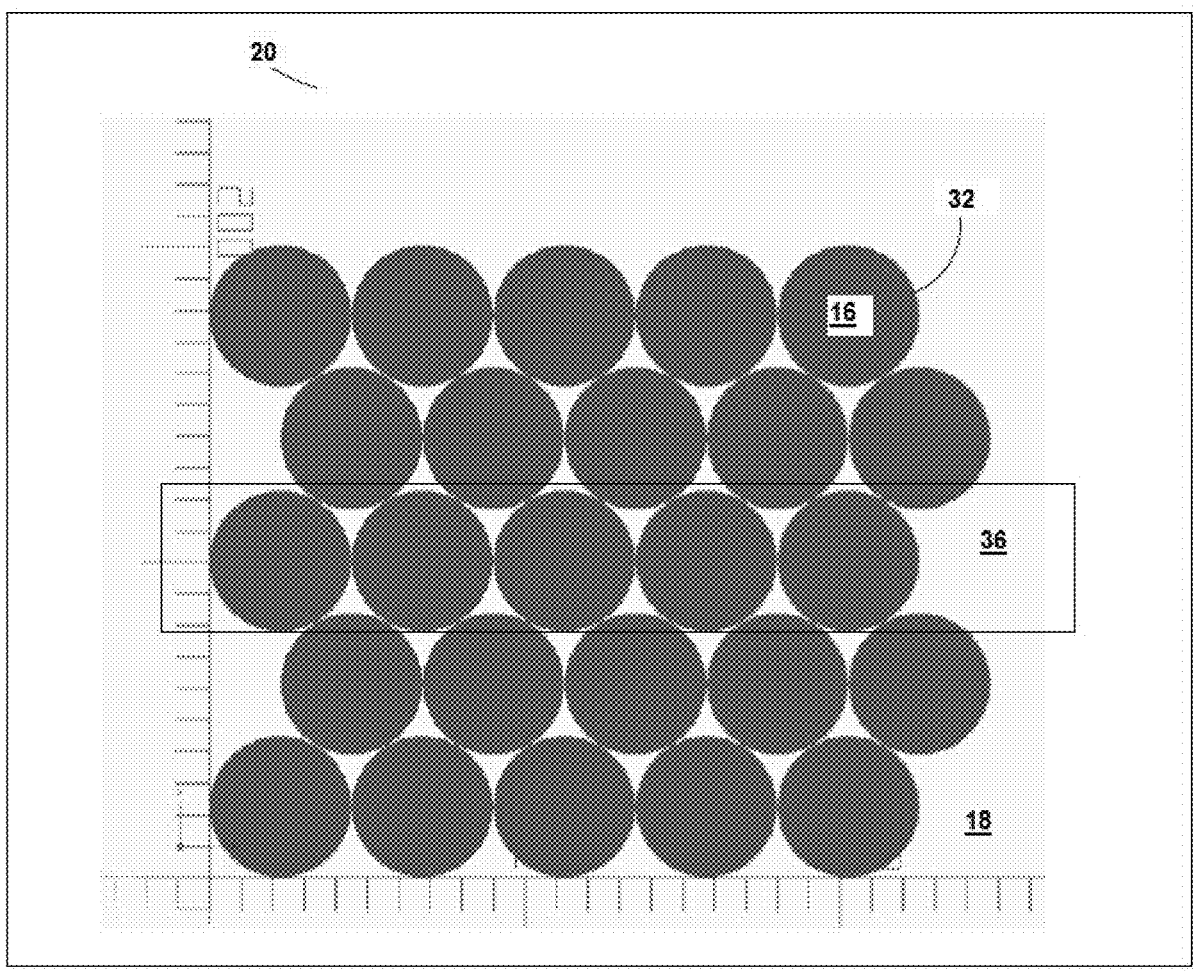
FIG. 8 is a distribution of berms in which with the berms in adjacent rows having been offset by half of the pitch between berms.
Figure 9:
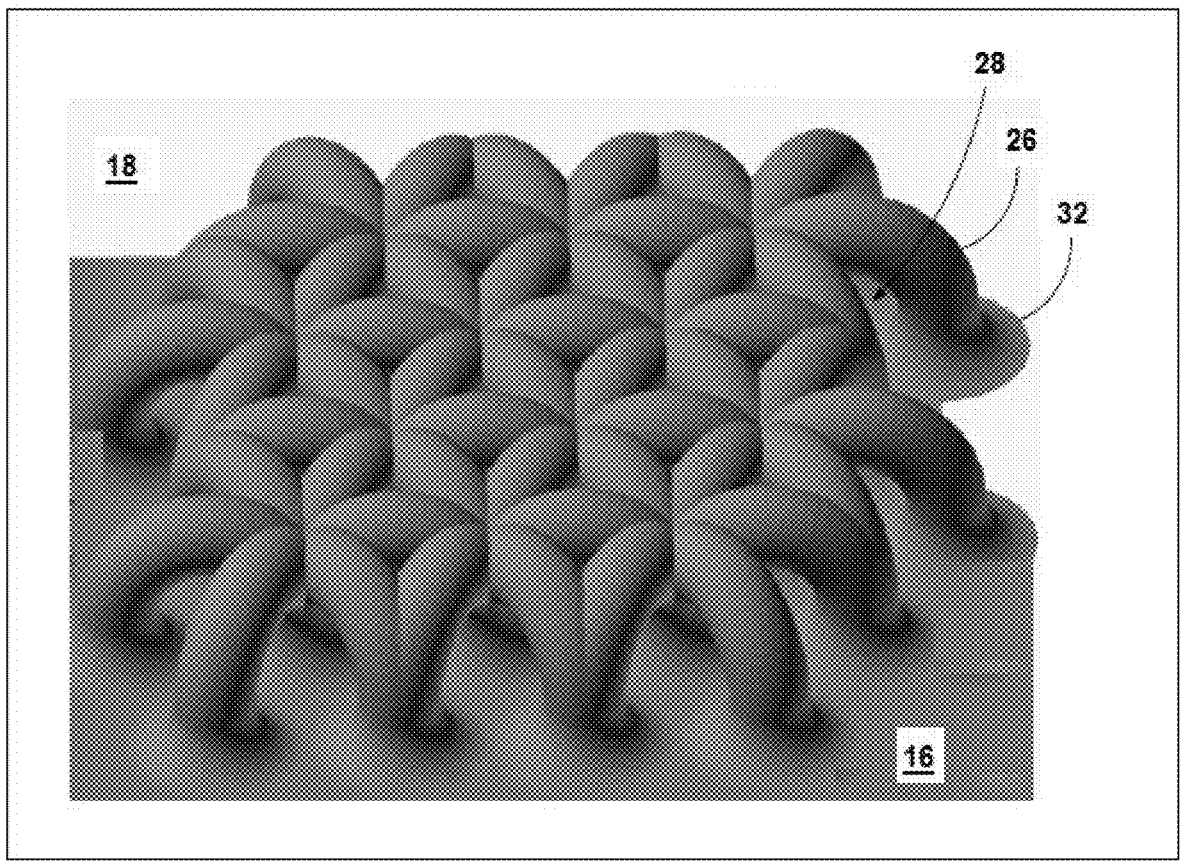
FIG. 9 shows an array of projections similar to that shown in FIG. 4 but distributed to form a hexagonal array with berms in adjacent rows having been offset by half of the pitch between berms.

FIG. 8 shows a distribution of berms 32 that is similar to that shown in FIG. 7 but with each berm row 36 having been offset by the berm's radius. The rows 36 have also been moved closer together so that each berm 32 contacts the maximum number of adjacent berms 32 without overlap. Preferably, the rows 36 are moved closer by a factor equal to the sine of sixty degrees. Each berm 32 within the interior of the array of berms 32 is adjacent to six other berms 32. This arrangement features a more compact distribution of projections 24 in which the toroidal portions 26 assume a hexagonal configuration, as shown in FIG. 9.

In generally, it is useful to populate an interface 20 with as many interlocks 24 as will fit. This is achieved, in the embodiments shown in FIGS. 4 and 9 by arranging the interlocks 24 into two-dimensional arrays. These are useful when the planar interface 20 has an aspect ratio that can accommodate a two-dimensional array. In some cases, the planar interface 20 is much longer than it is high. As a result, it is not practical to accommodate a two-dimensional array. Such embodiments feature a one-dimensional array of projections 24.

In the preceding embodiments, each berm 32 is linked to its adjacent neighbors by a toroidal portion 26. However, this is by no means a requirement. The distribution of toroidal portions 26 depends on other factors and need not require two or more toroidal portions 26 sharing the same berm 32.

The embodiments described thus far feature holes 28 that are distributed in a single layer. However, in an alternative embodiment, shown in FIG. 10, the holes 28 occupy two layers. This arrangement permits the first and second volumes 12, 14 to be interlocked at more locations.

Figure 10:
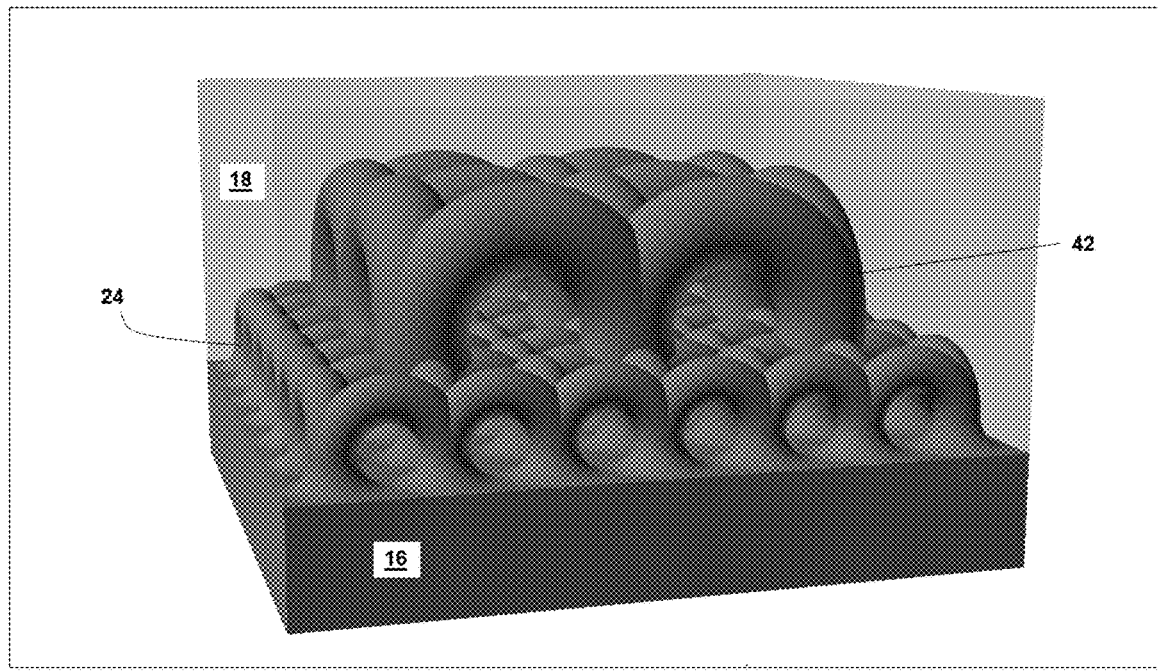
FIG. 10 shows an arrangement of projections like that shown in FIG. 4 but with projections showing a hierarchy of different sizes.

In another embodiment, shown in FIG. 10, the projections 24 have different sizes. This arrangement permits spatially-variable binding strengths between the first and second volumes 12, 14.

Figure 11:
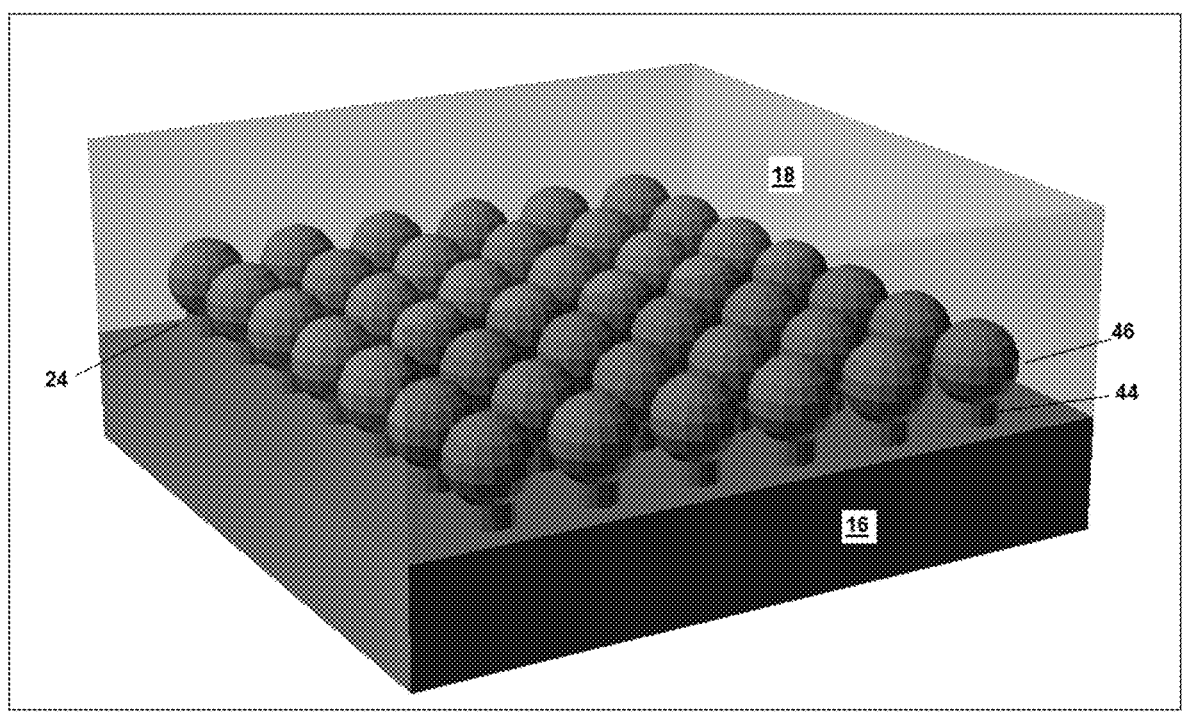
FIG. 11 is a perspective view of an arrangement of projections like that shown in FIG. 4 but with the projections no longer forming a loop.

The projections disclosed have been structures that include one or more holes. However, embodiments also include those in which the projections 24 have no holes. An example of such a projection 24 is a shaft 44 with an enlarged distal tip 46, as shown in FIG. 11. The enlarged distal tip 46 is ultimately entrapped within a corresponding recess formed in the second volume 14 during the additive manufacturing process.

Figure 12:
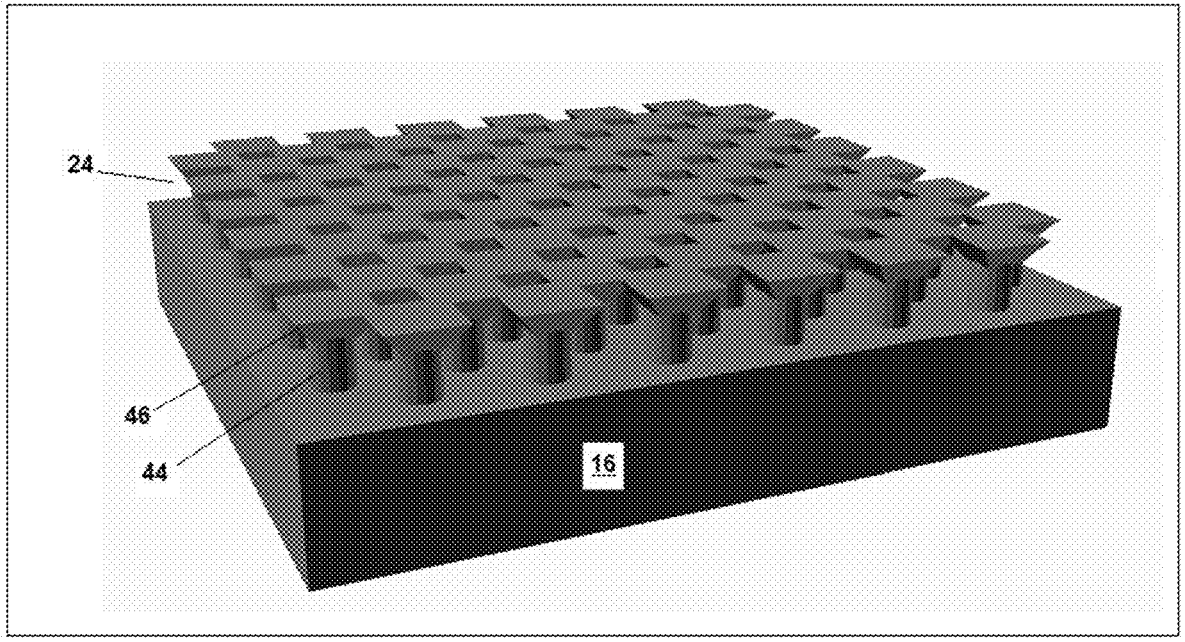
FIG. 12 is a perspective view of an arrangement of projections like that shown in FIG. 17 but with the projections having a pyramidal tip instead of a spherical tip.
Figure 13:
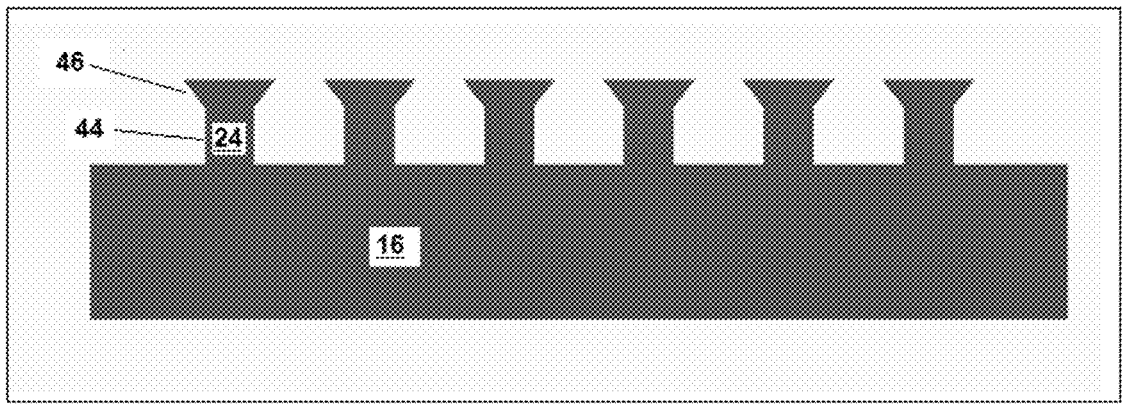
FIG. 13 is a cross-section of the projections shown in FIG. 12.

FIG. 11 shows an embodiment in which the enlarged distal tip 46 takes the form of a sphere. FIGS. 12 and 13 show an embodiment in which the enlarged distal tip 46 takes the form of an inverted pyramid.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, the interlock structures described herein and shown in the figures are toroidal projections. However, it is appreciated that other structures including open loop and hook-like structures are within the scope of the invention. Other various modifications as well may be made without departing from the scope of the invention. Additionally, some of the steps described above may be order independent, and thus can be performed in an order different from that described.

What is claimed is:

1. A method comprising, using a three-dimensional additive manufacturing process, forming an object that comprises a first volume, which is made of a first material, and a second volume, which is made of a second material that differs from said first material, wherein said first and second volumes meet at an interface that comprises an interlocking volume, wherein forming said object comprises depositing a succession of layers to form said interlocking volume, each of said layers comprising said first material and said second material arranged in a pattern such that said layers collectively define interlocking projections that are formed from said first material and that interlock with corresponding interlocking projections that are formed from said second material-, wherein depositing said succession of layers comprises causing said interlocking projections that are formed from said first material to comprise first closed loops, causing said interlocking projections that are formed from said second material to comprise second closed loops, and causing each of said first closed loops to interlock with a corresponding one of second closed loops.

2. The method of claim 1, further comprising selecting said first material and second materials such that said first material and said second material differ in rigidity and such that said first material and said second material differ in pliability.

3. The method of claim 1, wherein depositing said succession of layers comprises depositing a first layer of said succession of layers onto said first volume.

4. The method of claim 1, wherein depositing said succession of layers comprises causing each of said interlocking projections that is formed from said first material to comprise a closed loop and a hole that is defined by said closed loop.

5. The method of claim 1, wherein depositing said succession of layers comprises causing each of said interlocking projections to protrude from said first volume at a pair of roots.

6. The method of claim 1, wherein depositing said succession of layers comprises causing each of said interlocking projections to form a closed loop that encircles a portion of said second volume to resist a force that acts in a direction that urges said first and second volumes to separate and to resist a force that urges said first and second volumes to slide relative to each other.

7. The method of claim 1, wherein depositing said succession of layers comprises causing each of said interlocking projections to form a closed loop that emerges from berms in said first portion and encircles a portion of said second volume, wherein said closed loop resists a force that acts in a direction that urges said first and second volumes to separate, resists a force that urges said first and second volumes to slide relative to each other, and distributes shear forces across said berms.

8. The method of claim 1, wherein depositing said succession of layers comprises depositing a first of said layers on said first volume and, after having deposited a last of said layers, forming said second volume, whereby said interlocking volume separates said first and second volumes from each other.

9. The method of claim 1, wherein depositing said succession of layers comprises, for each of said interlocking projections formed from said first material, fabricating a reinforcement region from said first material, said reinforcement region being disposed at an interface from which said interlocking projection projects from said first volume.

10. The method of claim 1, wherein depositing said succession of layers comprises, for each of said interlocking projections formed from said first material, fabricating a circular reinforcement region from said first material, said circular reinforcement region being disposed at an interface from which said interlocking projection projects from said first volume.

11. The method of claim 1, wherein depositing said succession of layers comprises causing said interlocking projections formed from said first material to comprise hooks that project into said second volume.

12. The method of claim 1, wherein depositing said succession of layers comprises causing said first and second materials to completely fill said transition volume.

13. The method of claim 1, wherein depositing said succession of layers comprises causing said interlocking projections to comprise closed loops that are parallel to a plane and closed loops that are perpendicular to said plane.

14. The method of claim 1, wherein depositing said succession of layers comprises forming adjacent rows of berms on said first volume and forming closed loops, each of which projects from a pair of berms, wherein said adjacent rows of berms form a rectangular array, and wherein said closed loops assume a rectangular configuration.

* * * * *